United States Patent [19]

Terrell et al.

[11] Patent Number: 4,645,995
[45] Date of Patent: Feb. 24, 1987

[54] BATTERY CHARGER FOR PLURAL CELL HOLDING MODULES

[75] Inventors: Jacquelyn B. Terrell; Ferdinand H. Mullersman, both of Gainesville, Fla.

[73] Assignee: General Electric Company, Gainesville, Fla.

[21] Appl. No.: 608,254

[22] Filed: May 4, 1984

Related U.S. Application Data

[63] Continuation of Ser. No. 133,820, Mar. 25, 1980, abandoned.

[51] Int. Cl.⁴ ...................... H02J 7/00; H01M 10/46; H01H 61/00
[52] U.S. Cl. .......................................... 320/2; 320/15; 336/90
[58] Field of Search .................. 320/15, 2–4, 320/6; 336/90, 92; 429/97, 99, 100

[56] References Cited

U.S. PATENT DOCUMENTS

| | | | |
|---|---|---|---|
| 2,910,625 | 10/1959 | Carpenter . | |
| 3,277,358 | 10/1966 | Nicholl | 320/2 X |
| 3,371,302 | 2/1968 | Mas | 336/92 |
| 3,696,283 | 10/1972 | Ackley, III | 320/2 |
| 3,979,707 | 9/1976 | Prince | 336/107 |
| 4,009,429 | 2/1977 | Mullersman | 320/2 |

FOREIGN PATENT DOCUMENTS

| | | | |
|---|---|---|---|
| 212453 | 12/1960 | Austria | 320/2 |
| 853834 | 10/1970 | Canada | 320/6 |
| 2403905 | 8/1975 | Fed. Rep. of Germany . | |
| 1400235 | 4/1965 | France . | |
| 2346833 | 10/1977 | France . | |
| 1285191 | 8/1972 | United Kingdom . | |
| 1572856 | 8/1980 | United Kingdom . | |

Primary Examiner—R. J. Hickey
Attorney, Agent, or Firm—Henry J. Policinski

[57] ABSTRACT

A battery charger having a housing, a transformer in the housing and separate sets of external terminals situated on recessed surfaces at opposed sides of the housing, the external terminals being connected to separate secondary windings of the transformer so that the terminal sets are oppositely phased electrically. Blade connectors spaced apart along the line of spacing between opposed sides are electrically connected to the primary winding and extend through the housing for acceptance by an external electrical receptacle. A grounding pin being mechanically affixed to the transformer core structure and similarly extending through the housing.

20 Claims, 7 Drawing Figures

BATTERY CHARGER FOR PLURAL CELL HOLDING MODULES

This application is a continuation of application Ser. No. 133,820, filed 3/25/80 now abandoned.

BACKGROUND OF THE INVENTION

This invention relates to small low-cost battery chargers offering superior charging performance for consumer-size rechargeable batteries and more versatility over known chargers.

The present invention is an improvement over existing battery charging systems of the type described in U.S. Pat. No. 4,009,429. Such a charging system is marketed by General Electric Company, and enables cells of several different sizes to be charged. It comprises a battery charger unit which can be plugged into an electrical receptacle and one of several mating cell-holding modules which holds and interconnects two or four rechargeable cells.

The foregoing battery-charging system has achieved wide commercial acceptance with the public. It is effective, relatively inexpensive and easy to use. The terminals on the battery charger unit, and the construction of the cell-holding modules are such that it is virtually impossible to incorrectly mate the cell holding module with the battery charger. An important feature of that charger is the fact that it can be plugged directly into an electrical receptacle so that the charger, when mated with the cell-holding module, forms an integral unit that is supported by the receptacle itself. This eliminates the need for electric extension cords and the like, and enables the consumer to leave the charger plugged into the receptacle during cell charging. Moreover, the charger current is such that the cells may be left on "on-charge" continuously.

A limiting feature of the existing battery charger just described, however, is the fact that it can accept only one type of cell-holding module at any given time. Thus, should it be desired to charge immediately a pair of needed C-size cells while AA-size cells, for example, are being charged, the AA cell-holding module must be removed from the charger before charging is complete in order to substitute the C-size cell module. Another limitation of the existing charger is the fact that its charging current is restricted to about 0.1C, where C is the capacity of the cell in ampere-hours (Ah). Thus, for a typical AA-size battery having a nominal open circuit voltage of 1.2 volts and a capacity of 0.5 Ah, the C/10 charge current rate is 50 mA. At this rate, the recommended charging time is 12-16 hours. It is desirable to increase the charging rate up to about C/6 or 0.15C in order to enable the cells to attain full charge in 8-12 hours.

In order to achieve a higher charge rate, however, a larger transformer is required. This, in general, requires that the battery charging unit be able to withstand the greater mechanical loads transmitted to the blade connectors which plug into the outlet receptacle.

The present invention carries forward the teachings and advantages of the battery chargers and charging systems described in the above-mentioned U.S. Pat. No. 4,009,429. The present battery charger is adapted to mate with existing cell-holding modules but, in addition, supplies a greater charging current and is configured to accept two cell-holding modules simultaneously, whether the cells to be charged are the same or different sizes. Thus, in the present invention, it is possible to charge simultaneously cells of the AA, C and D size, as well as 9-volt application batteries. Additionally, the battery charger is arranged so that, when cell-holding modules are mated with it, the system does not block the second receptacle of a duplex outlet.

SUMMARY OF THE INVENTION

The present invention achieves the foregoing and other advantages through a novel cooperation of its essential elements. The battery charger comprises a charger housing having two opposed, generally parallel sides for the mounting of separate battery modules to be charged, these sides having affixed thereto first and second sets of external terminals for connection to the mating terminals of the battery module, the terminals being adapted to releasably support the module. A transformer at the interior of the housing has a core member, a primary winding and two secondary windings wound on the core, the secondary windings being connected respectively to the external terminals on the opposed sides so as to provide charging current thereto. A pair of blade connectors is electrically connected internally to the primary winding and extend from that side of the housing which is intermediate the opposed sides, these connectors being spaced apart in the direction of spacing between the opposed sides and supporting the charger in the electrical receptacle. In the preferred embodiment, a grounding pin is used to assist in supporting the load of the battery charger. This grounding pin is mechanically affixed to the core structure of the transformer and extends through the housing for acceptance by the ground contact of the receptacle.

DESCRIPTION OF THE DRAWINGS

For a complete understanding of the invention, reference should be made to the following detailed description and to the drawings, in which.

DESCRIPTION OF THE PREFERRED EMBODIMENT

Figure 1:
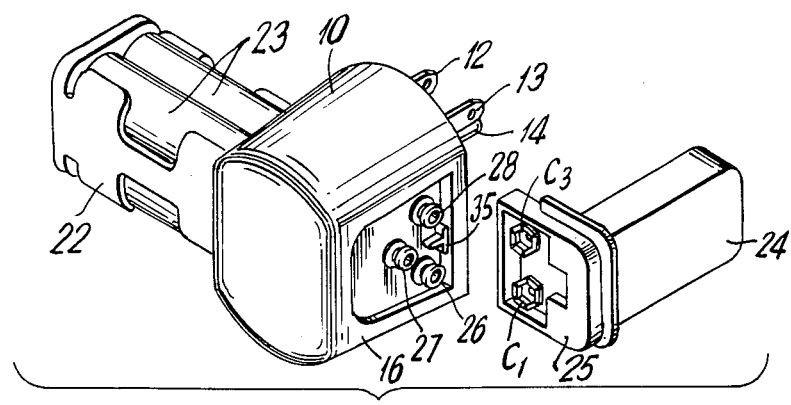
FIG. 1 is a pictorial representation of a battery charger in accordance with the invention, illustrated with two types of cell-holding modules that may be used therewith.
Figure 2:
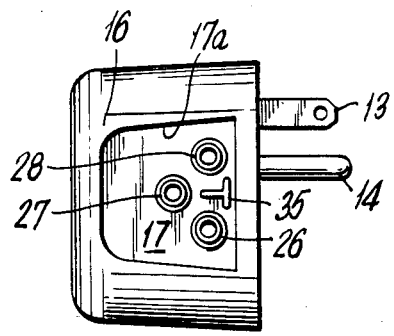
FIG. 2 is a side elevation view of the battery charger.
Figure 3:
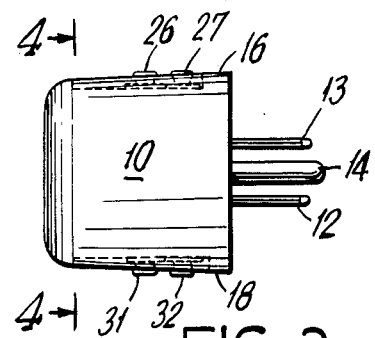
FIG. 3 is a plan view of the charger.

In FIG. 1, the battery charger of the invention is seen to include a housing member 10, a pair of blade connectors 12, 13, and a ground pin 14, all of which are received by the respective contacts of an electrical outlet receptacle (not illustrated) when the charger is plugged into the outlet for operation. These three connectors 12–14 serve not only to couple electrical power to the charger, but also to support physically the charger and the modules which are mated thereto.

Housing member 10 has a pair of opposed, generally parallel sides 16, 18 in which are formed recessed surfaces 17 and 19. Sides 16, 18 and blades 12, 13 are spaced apart along the same direction such that, when the charger is mated with two cell holding modules and plugged into a receptacle, it will not block the second outlet of a duplex outlet fixture. The connector blades 12, 13 and grounding pin 14 extend from inside the case through the housing cover member 20 which closes the open side of housing member 10.

In FIG. 1, two different types of representative cell-holding modules are shown. On the left side of the charger is a module 22 having a capacity for four AA-size cells 23. On the right of the charger, shown removed, is a 9-volt size battery 24 mated to an adapter 25. The cell-holding module 22 is described in detail in the above-mentioned U.S. Pat. No. 4,009,429, and also in U.S. Pat. No 4,173,733, both issued to General Electric Company. The battery charging module 22, holding four AA-size batteries, is a three terminal holder mating with one of the sets of terminals at the side of the charger. The adapter/holder 25, on the other hand, is a two-terminal device adapted to mate with two of the three external terminals at either side of the charger. The external charging terminals are clearly visible in the drawings and are similar to the terminals at the top of the prior commercial charger described above. In this case, however, there are two separate sets of three external terminals, and they are located at opposite sides of the charger; one set, 26, 27 and 28 on recessed surface 17, and another set, 30, 31 and 32 on recessed surface 19. Terminals 26–28, 30–32, are snap-type terminals which releasably support the weight of the modules when the modules are snap-fastened onto the charger. It will be noted that the external terminals at the sides of the charger are asymmetrically situated with respect to the recessed surfaces 17, 19, so as to preclude inadvertent misconnection of a cell-holding module or adapter. The walls 17a, 19a, formed in the side of the housing by the recessing of the surfaces cooperate in the terminal locating function of the charger, in that the wall prevents a module from being turned around and connected with reversed polarity. Additionally, there is a small T-shaped projection 35 disposed between the terminals at each side of the battery charger. Its function is to assist in the orienting and disconnecting of the terminals of the module relative to the charger.

Figure 4:
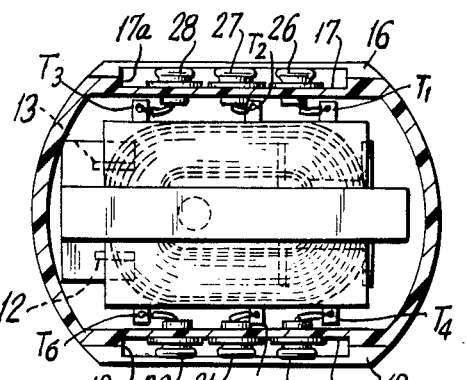
FIG. 4 is a cross-sectional view taken along the line 4—4 of FIG. 3.
Figure 5:
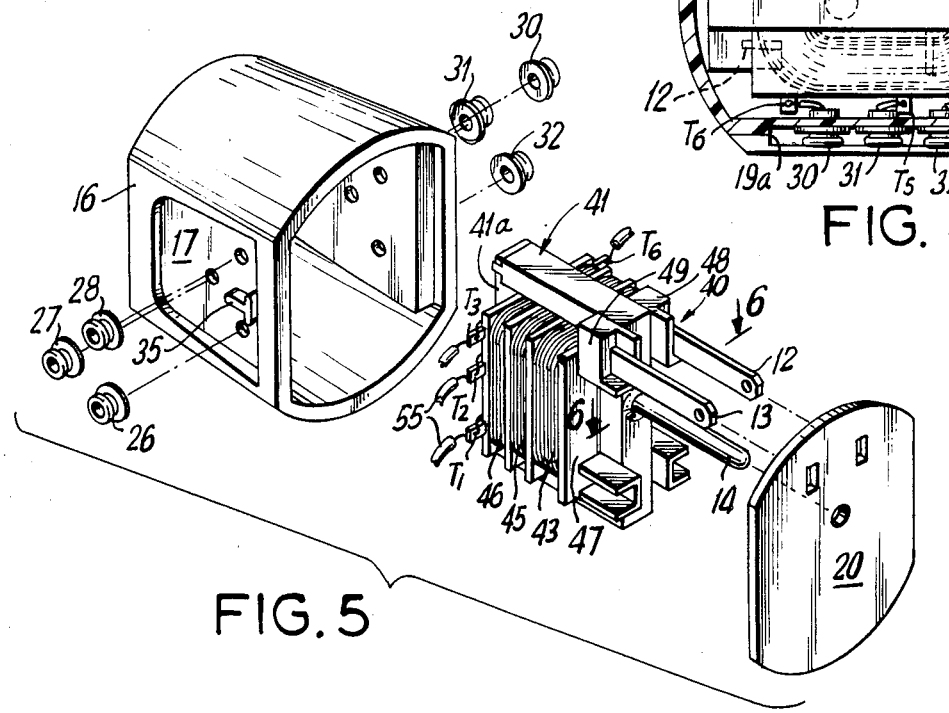
FIG. 5 is an exploded view of the components of the charger.

Referring to FIGS. 4–5, the interior of housing 10 carries a charging transformer 40 comprising a core assembly 41, a primary winding 43 wound on the core, and two secondary windings 45, 46 also wound on the core. The transformer steps down the applied line voltage, the secondary windings supplying ac charging current at low voltage (e.g., 10 volts rms). As is conventional, the primary and secondary windings of the transformer are wound about a bobbin structure 47 which subsequently is inserted over the center leg of the core 41 before the back section 41a of the core is added to complete the magnetic circuit. In accordance with the invention, the transformer windings are selected to provide a nominal charging current of approximately 0.15C to the external terminals. Also in accordance with the invention, the transformer is connected to these external terminals such that the corresponding external terminals on the respective sides are oppositely poled electrically, the purpose of which will be explained shortly. The transformer core structure supports the blades 12, 13, which are mounted in insulating blocks 48, 49 comprising part of the bobbin 47.

Figure 6:
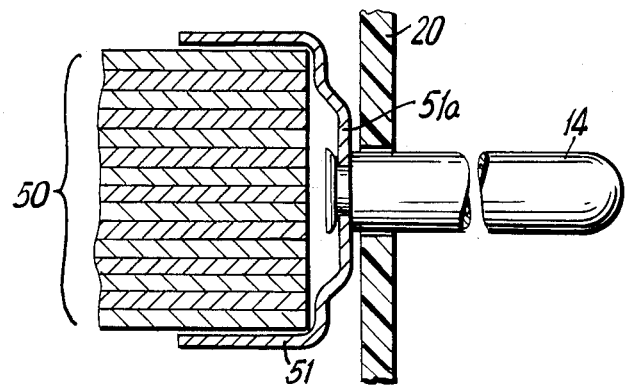
FIG. 6 is a partial view in cross-section taken along the line 6—6 in FIG. 5.

Encasing the core laminations 50 (separately illustrated) and forming an integral part of the core is a metal channel 51 which clamps together the laminations. This structure is shown in detail in FIG. 6, which is a view in partial cross-section along the line 6—6 in FIG. 5. As shown, channel member 51 also serves as a mounting plate for the grounding pin 14. To that end, it has a slightly raised section 51a in the vicinity where the pin 14 is joined to it.

A special feature of the invention is the ability of the charger to accommodate either one or two externally connected modules without any ancillary mechanical support. Since the transformer assembly and the housing containing the external terminals form a unitary mechanical structure, any forces applied to the housing are also transmitted to the transformer assembly. It will be seen, therefore, that torque and gravitational forces resulting from the affixing of an external module to one or both sets of external terminals are transmitted by the housing 10 to the transformer assembly and, consequently, to the blade connectors 12, 13 and grounding pin 14. In order to reduce the torque that would be applied to the connectors by connecting a single module or modules of different weight to the charger, thereby creating a mechanical imbalance, the casing, transformer windings and core all are made narrower in the dimension between the two module-receiving faces. Thus, the cross-section of the transformer core 41 is narrower in the direction of spacing between the two module-receiving faces than it is in the direction of spacing between the other two sides of the housing. In one preferred embodiment, the core cross-section is $\frac{1}{4}$ inch $\times \frac{3}{8}$ inch. Also, grounding pin 14 aids in resisting torque forces because it is mechanically and rigidly secured to the metal channel 51 of the transformer core.

Referring to FIGS. 4 and 5, the transformer terminals $T_1$–$T_6$ are affixed to the core bobbin assembly for connection by wire leads 55 to appropriate ones of the terminals 26–28, 30–32. In practice, these leads 55 are first affixed to the internal part of the external terminals and subsequently are soldered to the transformer terminals $T_1$–$T_6$ prior to placement of the transformer assembly into the case 10. Thereafter, cover 20, which has cut-outs for receiving the blade connectors 12, 13, and grounding pin 14, is put into place to close the housing 10. Cover 20 is secured to the housing member 10 by any appropriate bonding method, for example, sonic welding.

Figure 7:
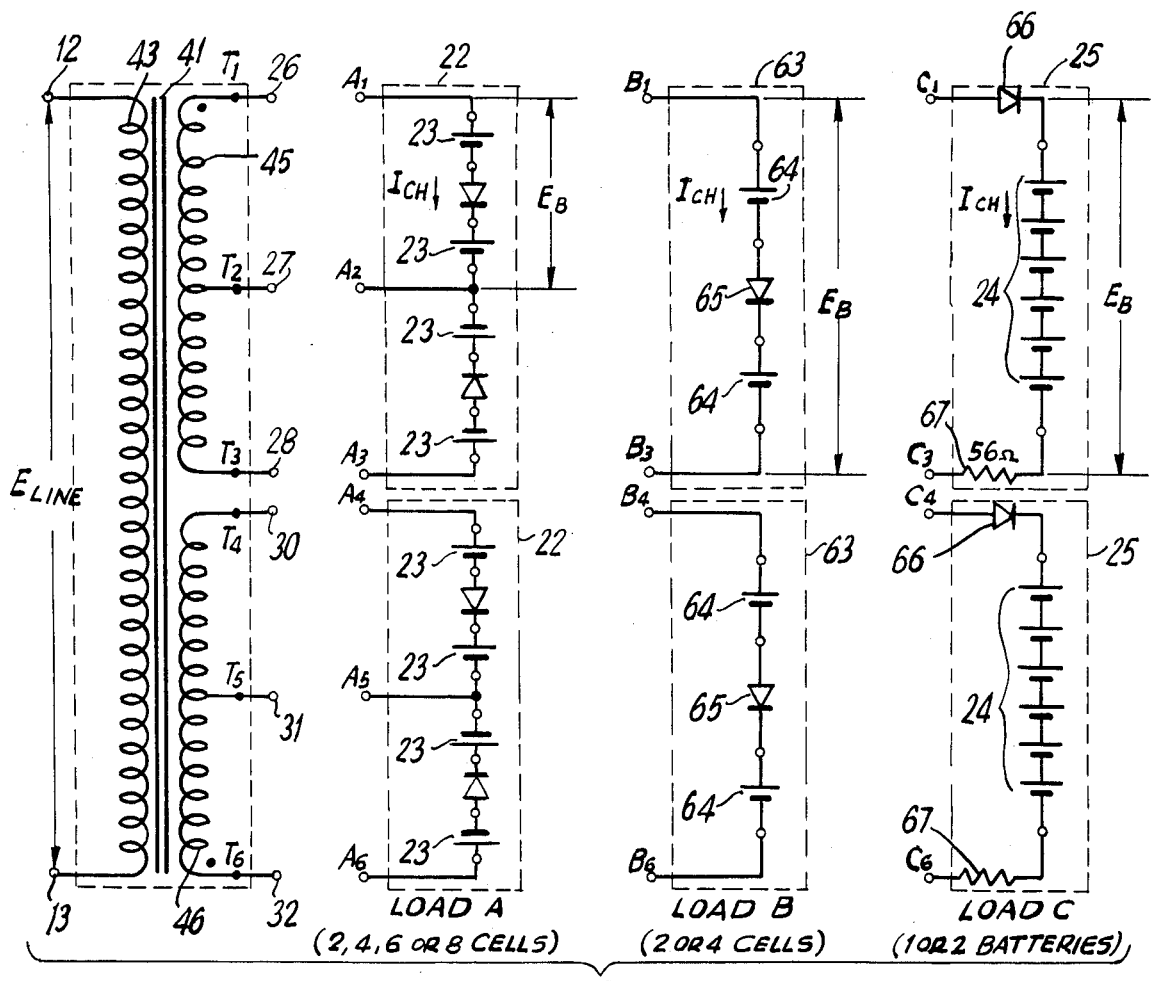
FIG. 7 is a series of electrical diagrams of the battery charger and representative cell-holding modules that may be coupled to it.

FIG. 7 illustrates the electrical circuits that may be associated with the charger, which is shown on the left-hand side of the figure. As previously noted, the primary winding 43 is wired to terminal connectors 12, 13 for connection to line voltage $E_{LINE}$. Secondaries 45, 46 have their respective terminals $T_1$–$T_3$ and $T_4$–$T_5$ wired to external terminals 26–28 and 30–32, respectively, also as previously explained. The three figures to the right of the transformer schematically illustrate three types of loads, LOAD A, LOAD B and LOAD C, which may be encountered by the charger during use.

LOAD A represents the electrical schematic for battery-charging modules 22 of the type illustrated in FIG. 1, each holding two or four cells. With two such modules connected to the charger, up to eight AA-size cells can be charged at one time. These modules contain internal circuits for interconnecting the cells, and for rectifying the applied current. Rectification is brought about by the diodes 60, 61 connected in series with the cells. These diodes also preclude inadvertent discharge of the cells in the event of accidental shorting of any of the terminals $A_1$–$A_3$, or $A_4$–$A_6$. It will be appreciated that upon connection of the battery charger primary to an external source $E_{LINE}$, and assuming that two four-cell modules 22 are attached to the charger, charging current $I_{CH}$ will flow simultaneously through the cells connected between terminals $A_1$ and $A_2$, and through the two cells connected between terminals $A_5$ and $A_6$ of the second module. This is because the transformer secondaries are poled so that the corresponding external terminals are electrically out of phase. When the charger is connected to loads such as LOAD A, this opposite electrical polarity has no material significance, since each secondary will distribute no more than one-half the maximum total charging current during any half cycle irrespective of the number of cells held by the modules 22. Specifically, because the diodes 60, 61 are connected so as to be alternately conducting, no more than four cells are supplied with charging current during any half-cycle of line current.

LOAD B represents the type of load encountered by the charger when two C-size or two D-size cells 64 are connected to the charger in a two-cell module 63, which includes rectifying diode 65. Here the charger is sensitive to the flow of charging current. If the secondaries of the charger were improperly poled electrically, it would be possible for the charger to deliver the maximum total charging current during only one-half cycle of the input wave form, with no charging current being delivered during the other half of the waveform. This condition would subject the charger to very poor voltage and current regulation and, to a certain extent, would require the transformer to be designed to handle more primary current than necessary. For this reason, the corresponding external terminals of the charger 28, 30 are poled so as to be electrically out of phase while terminals 26 and 32 are in phase. Thus when terminal 26 is at maximum positive amplitude, terminal 32 is also at maximum positive amplitude and terminals 28 and 30 are at maximum negative amplitude. And when loads of the LOAD B type are connected, current is delivered to the respective modules on separate half-cycles of the input wave. The same situation prevails when charging loads such as LOAD C. This is the type of load encountered with adapter/battery combinations, such as illustrated in FIG. 1 by battery 24 and adapter 25. Here again, the adapter includes the diode 66, as well as a current limiting resistor 67 in order to protect the generally smaller size cells making up the battery from receiving excessive charging current. Various embodiments of the adapter and battery will be found in co-pending application Ser. Nos. 877,297, 877,299 and 877,281, all filed Feb. 13, 1978, and in Ser. No. 878,453, filed Feb. 16, 1978.

The table below sets forth the charging current delivered at the minimum and maximum values of applied line voltage for the various types of loads shown, assuming that the two modules are connected to the transformer.

| $E_{LINE}$ (AC Volts) | $E_B$ (DC Volts) | $I_{CH}$ (mA) |
|---|---|---|
| LOAD A (2, 4, 6 or 8 Cells each rated at 500 mAh) | | |
| 104 | 2.9 | 50 Min. |
| 127 | 2.9 | 100 Max. |
| LOAD B (2 or 4 Cells each rated at 1.0 Ah) | | |
| 104 | 2.9 | 110 Min. |
| 127 | 2.9 | 160 Max. |

-continued

| $E_{LINE}$ (AC Volts) | $E_B$ (DC Volts) | $I_{CH}$ (mA) |
|---|---|---|
| LOAD C (1 or 2 Batteries each rated at 65 mAh) | | |
| 102 | 8.7 | 8 Min. |
| 127 | 8.7 | 18 Max. |

It is seen that AA-size cells (LOAD A) rated at 500 mAh are charged nominally at a rate of 0.15C (75mA) at $E_{LINE}$=115 volts. Typical C size and D size cells rated at 1.0 Ah will be charged at a rate of about 0.14C (140 mA) when line voltage is 115 volts. Batteries (LOAD C) rated at 65 mAh are charged at a 0.2C rate when line voltage is 115 volts. Battery charging current in this instance is limited by the 56 ohm resistor in the charging circuit of adapter 25, and could be increased by reducing the resistance value. Current draw is dependent upon the cell emf and its polarization voltage together with the transformer characteristics. However, charging current obtained in the present invention is significantly higher than that furnished in the prior single-module charger.

Phasing of the transformer secondary winding so that the corresponding external terminals are oppositely phased brings about operation at higher charging currents than would be obtained with in-phase secondaries. By way of comparison, for one case of LOAD B, a charger with in-phase secondaries produced charging currents averaging from 95 mA to 117 mA. Out-of-phase secondaries produced charging currents averaging from 112 mA to 146 mA, or 15%–25% higher.

While the use of two secondary windings is preferred, owing to the better current regulation obtained when changing from the two cell to four cell configurations of load A, it is possible to employ a single non-tapped secondary winding where poorer charge current regulation can be tolerated. In such case, the end terminals of the secondary winding are connected to the corresponding external terminals at both sides of the charger, instead of only one side. If this is done, it is preferable to employ rectifying diodes between the secondary winding and the external terminals so that charging current pulses supplied to the respective sets of terminals occur on alternate lobes of the sine wave. This improves the current regulation by insuring that a charging load connected to one set of terminals does not conduct current at the same instant as a load connected to the other set of terminals.

In other modifications, the charger may incorporate rectifying diodes internally of the housing as, for example, in cases where the cell-holding module does not have any rectifying means, The diodes would be connected between one of the transformer terminals $T_2$, $T_3$, or $T_4$, $T_6$ and the corresponding external terminal. It should also be noted that the rectifier could be connected so as to be compatible with certain cell-holding modules of the type illustrated in which diodes are incorporated therein.

From the foregoing, it will be seen that the improved charger of the present invention provides versatility in several features not found in the prior art chargers. Specifically, it permits the simultaneous connection and charging of more than one external battery circuit or module, and permits the mixing of several types and kinds of loads which may require different charging currents. The charger is inexpensive, compact, attractive, and allows use in a duplex receptacle while leaving the second receptable accessible for use by the consumer. In addition to the foregoing, it permits cells to be charged at significantly faster rates. This follows from the ability to package a larger transformer within a compact case while meeting the safety requirements of restricted mechanical stresses applied to the receptacle connectors.

Although the invention has been described with reference to the preferred embodiment, it will be understood that certain minor modifications and variations can be made within the scope and spirit of the invention. Accordingly, except as expressly limited by the appended claims, the invention should not be considered restricted to the embodiment illustrated.

What we claim is:

1. A battery charger comprising:
    a housing having first and second sets of external terminals located for simultaneous connection to the corresponding terminals of separate external battery circuits to be charged, said external terminals each including means for releasably supporting a respective battery circuit when the corresponding terminals of said battery circuit are connected for charging,
    a transformer inside the housing comprising a core member having a frame extending therearound, a primary winding and two secondary windings each having a pair of end terminals, such terminals being connected internally of the housing to separate ones of a respective set of external terminals,
    blade connectors electrically connected to said primary winding and extending to said housing for acceptance by an external electrical receptacle, and
    a ground pin connector adapted for acceptance by the external electrical receptacle, said ground pin connector being mechanically affixed to said core frame and extending therefrom through said housing, said connectors being adapted to support said charger and said external battery circuits when said connectors are disposed in the receptacle.

2. A battery charger comprising a charger housing having two opposed, generally parallel sides for the mounting of separate battery modules holding cells to be charged, said sides having recessed module-receiving surfaces, first and second external terminals on each of said recessed surfaces for connection to mating terminals of the battery module, said terminals being formed to releasably support the module connected thereto,
    a transformer at the interior of said housing having a core member, a primary winding and at least one secondary winding wound on said core member, said secondary winding having end terminals connected respectively to the external terminals on at least one of said sides,
    a pair of blade connectors electrically connected to said primary winding extending from a side of said housing intermediate said opposed sides for acceptance by the line contacts of an electrical receptacle, said blade connectors being spaced apart in the direction of spacing between said opposed sides, and a grounding pin affixed to said transformer core member and extending therefrom through said housing for acceptance by the ground contact of the electrical receptacle.

3. The battery charger of claim 2, wherein said external terminals are asymmetrically situated relative to said recessed surfaces.

4. The battery charger of claim 2, wherein said transformer has two secondary windings each connected to said external terminals on one of said sides so that the corresponding terminals on said opposed sides are electrically out of phase.

5. In combination with the battery charger of claim 4, a cell-holding battery module having at least one cell-receiving space and circuit means for connecting the cell to terminals adapted to mate with the external terminals on one side of said battery charger,
    said circuit means including a diode operative to cause charging current to flow via said mating terminals through the cell in opposition to the cell voltage.

6. In combination with the battery charger and cell-holding module of claim 5, a second cell-holding battery module having at least one cell-receiving space and circuit means for connecting the cell to terminals adapted to mate with the external terminals at the other side of the charger,
    said circuit means including a diode operative to cause charging current to flow via its mating terminals through the cell in opposition to the cell voltage and on an opposite half-cycle of secondary current relative to the charging of the cell in said first module.

7. The battery charger of claim 2, further comprising rectifier means connected between an end terminal of said secondary winding and one external terminal at each of the opposed sides such that the corresponding terminals on opposed sides conduct current on opposite halves of the secondary winding current waveform.

8. A battery charging system comprising:
    a charger housing having first and second sets of external terminals disposed on the surface of said housing;
    a pair of separate external battery holding modules each having a battery circuit, each of said modules in said pair having at least one module terminal disposed in the same location on each of said modules and electrically connected to its respective battery circuit, a first terminal in said first set of external terminals adapted to be interchangeably electrically connected to each of said at least one terminal of each of said modules, said first terminal in said first set corresponding to a first terminal in said second set adpated to be interchangeably connected with each of said at least one terminal on each of said modules, one of said modules in said pair electrically connected to and releaseably supported by said first set of external terminals, the other of said modules in said pair electrically connected to and releaseably supported by said second set of external terminals;
    means for establishing instantaneous opposite electrical polarity in said corresponding first terminals in each of said sets upon connection of said charging system to a source of charging current;
    a transformer inside said housing comprising a core member, a primary winding and second winding means connected to each of said sets of external terminals internally of said housing for delivering charge current to each of said sets of external terminals; and
    blade connectors electrically connected to said primary winding and extending through said housing for acceptance by an external electrical receptacle, said connectors being adapted to support said charging system when said connectors are disposed in said receptacle.

9. The battery charging system of claim 8, wherein said sets of external terminals are situated on opposed sides of said housing, said blade connectors extending through a side of said housing intermediate said opposed sides.

10. The battery charging system of claim 9, wherein said external terminals are situated on surfaces which are recessed in said opposed sides so as to form a wall bounding said surfaces.

11. The battery charging system of claim 10, wherein said external terminals are asymmetrically located relative to said recessed surfaces.

12. The battery charging system of claim 8, in which said housing comprises a housing member open at the side through which said blade connectors project, and a mating cover closing said open side and having apertures therethrough for receiving said blade connectors.

13. The battery charging system of claim 8, wherein said sets of external terminals are situated on opposed sides of said housing and said core member is oriented substantially parallel to said opposed sides.

14. The battery charging system of claim 13, wherein the cross-sectional dimension of said core in the direction of spacing between said opposed sides is smaller than the cross-sectional dimension of said core in directions mutually orthogonal to said spacing direction.

15. The battery charging system of claim 8, wherein said transformer and said housing containing said external terminals form a unitary mechanical assembly, said transformer and said housing acting in combination to transmit at least a portion of any forces applied to said housing to said transformer assembly and to said blade connectors.

16. The battery charging system of claim 8, wherein: said first and second sets of external terminals are arranged to provide polarity keying thereof relative to the battery circuits connectable thereto.

17. The battery charging system of claim 8, wherein one of said battery circuits is carried by one of said battery holding modules and includes a first diode operative to permit charging current to flow through said one of said circuits only in one direction.

18. The battery charging system of claim 17, wherein said other of said battery circuits in said pair is carried by the other of said cell holding modules and includes a second diode operative to permit charging current to flow through said other of said circuits one in one direction.

19. A battery charging system comprising:
a housing having first and second sets of external terminals disposed on the surface of said housing;
a transformer inside said housing comprising a core member, a primary winding and second winding means connected to each of said sets of external terminals internally of said housing for delivering charge current to each of said sets of external terminals;
blade connectors electrically connected to said primary winding and extending through said housing for acceptance by an external electrical receptacle, said connectors being adapted to support said charging system when said connectors are disposed in said receptacle;
a pair of separate external battery circuits each having a first battery circuit terminal electrically connected therein, each of said first battery circuit terminals adapted to be interchangeably electrically connected to and supported by corresponding terminals in each of said first and second sets of external terminals, one of said circuits in said pair electrically connected to and releaseably supported by said first set of external terminals and the other of said circuits in said pair electrically connected to and releaseably supported by said second set of terminals; and
means for establishing instantaneous opposite electrical polarity in said corresponding terminals in each of said sets upon connection of said charging system to a source of charging current.

20. A battery charging system comprising:
a pair of rechargeable batteries each having a positive and negative discharge terminal for delivering electrical energy to an energy-using device;
a housing having first and second sets of external terminals disposed on the surface of said housing, one of said terminals in said first set adapted to be electrically connected to and to deliver charge current into said positive discharge terminal of one of said rechargeable batteries, said one of said terminals in said first set corresponding to one of said terminals in said second set adapted to be electrically connected to and to deliver charge current into said positive discharge terminal of the other of said rechargeable batteries;
a transformer inside said housing comprising a core member, a primary winding and second winding means connected to each of said sets of external terminals internally of said housing for delivering charge current to each of said sets of external terminals;
blade connectors electrically connected to said primary winding and extending through said housing for acceptance by an external electrical receptacle, said connectors being adapted to support said charging system when said connectors are disposed in said receptacle;
a pair of identical battery holding modules each having a battery circuit including therein one of said rechargeable batteries, each of said modules adapted to be electrically connected to and releaseably supported by said first set of terminals and alternatively to and by said second set of terminals, one of said modules in said pair connected to and releaseably supported by said first set of terminals while the other of said modules in said pair is electrically connected to and releaseably supported by said second set of terminals, each of said modules including in its respective battery circuit unidirectional current flow means for permitting the flow of current in only one direction through its respective battery circuit; and
means for establishing instantaneous opposite electrical polarity in said corresponding terminals in each of said sets upon connection of said charging system to a source of current.

* * * * *